United States Patent
Wu

(10) Patent No.: US 8,579,519 B2
(45) Date of Patent: Nov. 12, 2013

(54) CABLE ASSEMBLY TRANSMITTING WITH ELECTRICAL AND OPTICAL SIGNALS

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 128 days.

(21) Appl. No.: 13/290,150

(22) Filed: Nov. 7, 2011

(65) Prior Publication Data

US 2012/0114288 A1    May 10, 2012

(30) Foreign Application Priority Data

Nov. 5, 2010    (CN) .......................... 2010 1 0533110

(51) Int. Cl.
*G02B 6/44* (2006.01)
*G02B 6/36* (2006.01)
*H01R 25/00* (2006.01)

(52) U.S. Cl.
USPC ................. 385/75; 385/77; 385/93; 385/101; 439/655

(58) Field of Classification Search
None
See application file for complete search history.

(56) References Cited

U.S. PATENT DOCUMENTS

| | | | |
|---|---|---|---|
| 7,079,733 B2 * | 7/2006 | Toriumi et al. | 385/101 |
| 7,651,379 B1 | 1/2010 | Wu | |
| 2010/0080519 A1 * | 4/2010 | Ko et al. | 385/93 |

* cited by examiner

*Primary Examiner* — Jerry Rahll
(74) *Attorney, Agent, or Firm* — Wei Te Chung; Ming Chieh Chang

(57) ABSTRACT

A cable assembly (100) includes a first connector (1), a second power connector (2) arranged with the first connector in a side by side manner, and a cable (3). The first connector includes a first insulative housing (11), a set of terminals coupled to the first insulative housing for transmitting electrical signals, and an optical module (14) attached to the first insulative housing and stacked with the terminals for transmitting optical signals. The cable includes a set of first electrical wires (31) connecting with the first terminals, a plurality of optical fibers (32) connecting with the optical module, and a plurality of second electrical wires (33) connecting with the second power connector.

19 Claims, 7 Drawing Sheets

CABLE ASSEMBLY TRANSMITTING WITH ELECTRICAL AND OPTICAL SIGNALS

BACKGROUND OF THE INVENTION

1. Field of the Invention

The present invention relates to a cable assembly, and more particularly to a cable assembly adapted for transmitting electrical and optical signals.

2. Description of Related Art

Nowadays, an electrical device has become lower profile and multi-functional, and a cable assembly for the electrical device is also capable of high-speed transmitting, and reliably connection and easily detachable with its counterpart. Cable assemblies in accordance with USB, SATA, HDMI, SAS and Displayport protocol have been widely applied in different kinds of electronic devices. The aforementioned cable assemblies depend on metallic terminals and copper wires to achieve electrical signal transmitting. However, transmitting speed is limited via electrical signal transmitting. In other aspect, as transmitting speed increasing, a structure of the cable assembly becomes complex, and a total dimension of the cable assembly is increased.

Hence, an improved cable assembly is highly desired to overcome the above problems.

BRIEF SUMMARY OF THE INVENTION

According to one aspect of the present invention, a cable assembly comprises a first connector, a second power connector arranged beside the first connector in a side by side manner for supplying power energy, and a cable. The first connector comprises a first insulative housing, a plurality of terminals coupled to the first insulative housing for transmitting electrical signals, and an optical module attached to the first insulative housing and stacked with the terminals for transmitting optical signals. The cable comprises a plurality of first electrical wires connecting with the first terminals, a plurality of optical fibers connecting with the optical module, and a plurality of second electrical wires connecting with the second power connector.

According to another aspect of the present invention, a cable assembly comprises a first connector and a second power connector adapted for supplying power energy. The first connector comprises a substantially rectangular first mating port protruding forwardly. The first mating port comprises a tongue portion having a cavity recessed downwardly from a top side thereof and a depression recessed upwardly from a bottom side thereof, a plurality of terminals having contacting portions retained in the tongue portion and exposed upwardly to the cavity for transmitting electrical signals, and an optical module received in the depression and having a plurality of lenses exposed to a front face of the tongue portion for transmitting optical signals. The second connector comprises a circle second mating port protruding forwardly. The second mating port defines a front end located behind a front end of the first connector in a front-to-back direction.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details.

Figure 1:
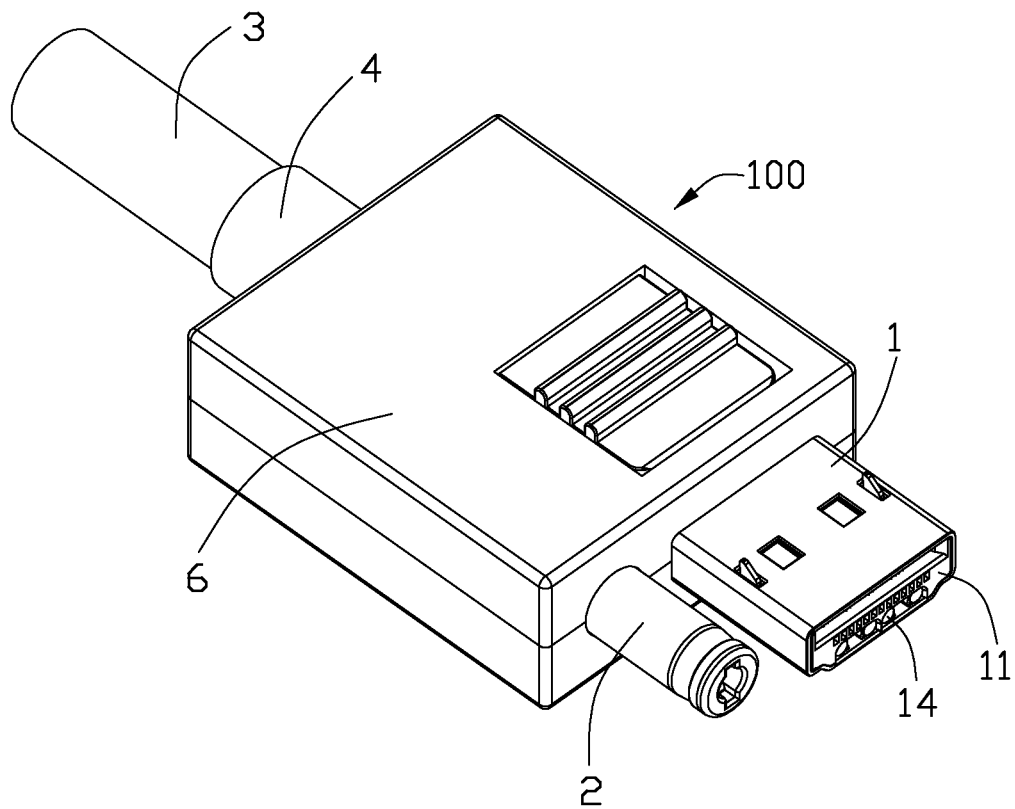
FIG. 1 is an assembled, perspective view of a cable assembly according to an embodiment of the present invention.
Figure 2:
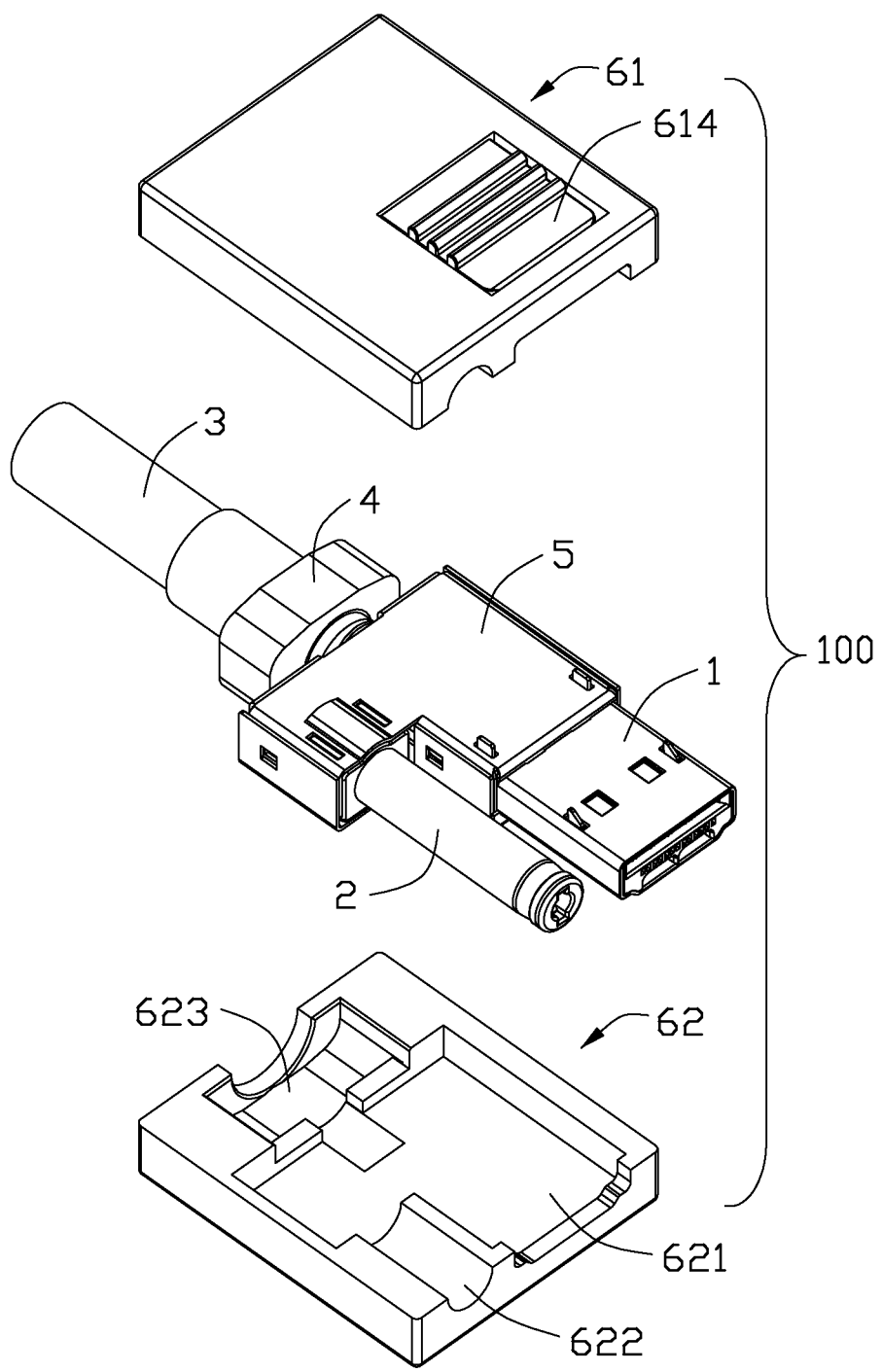
FIG. 2 is a partially exploded view of the cable assembly shown in FIG. 1.
Figure 3:
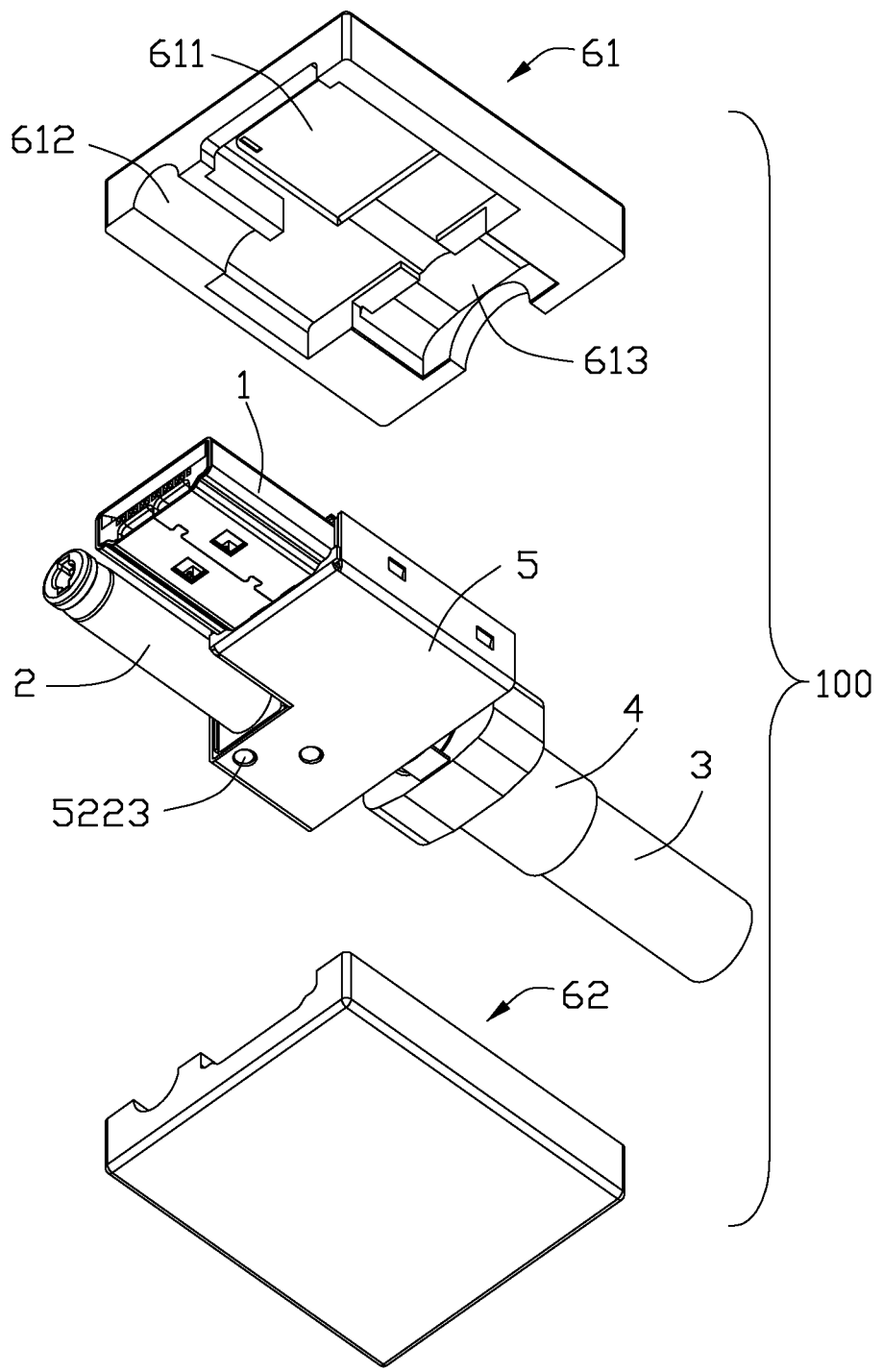
FIG. 3 is similar to FIG. 2, but viewed from another aspect.
Figure 4:
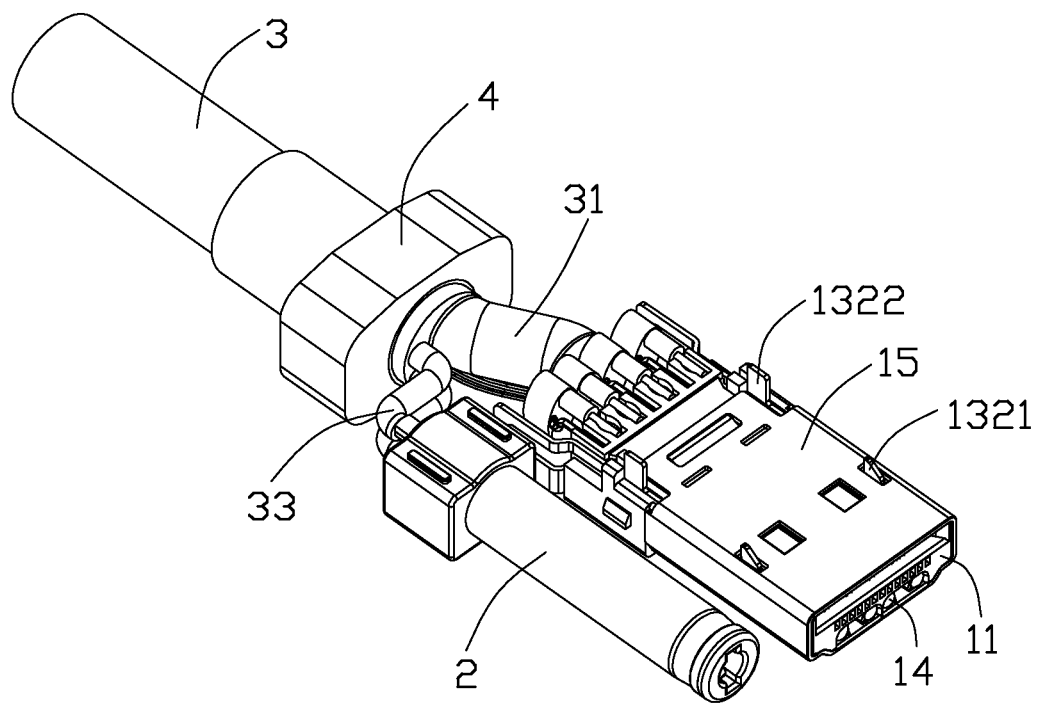
FIG. 4 is a partially assembled view of the cable assembly shown in FIG. 1.
Figure 5:
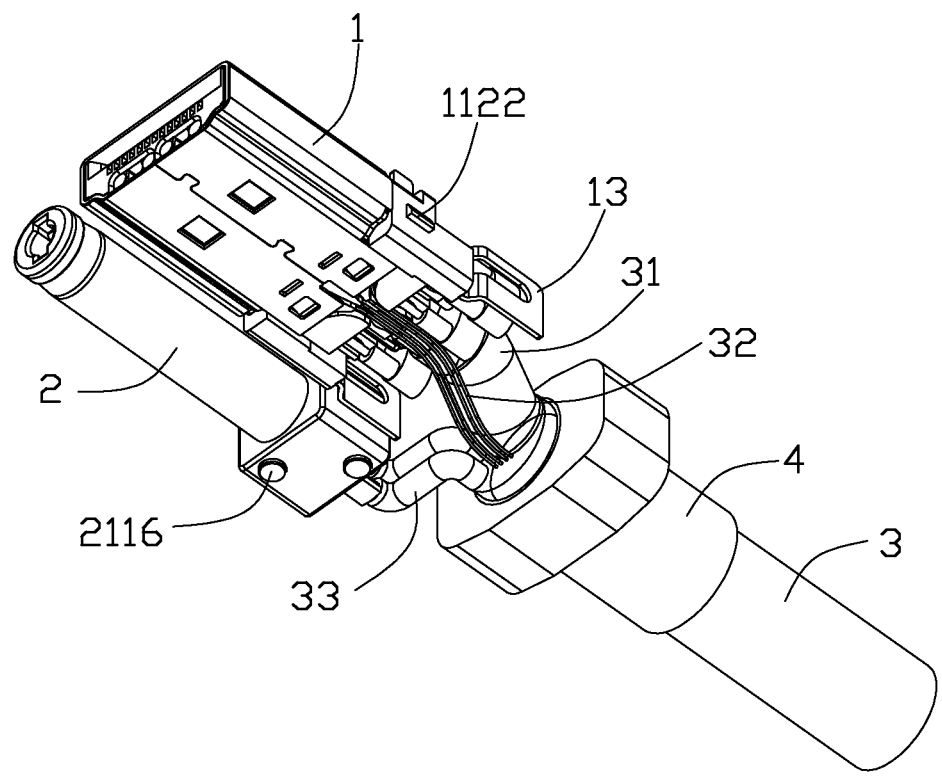
FIG. 5 is similar to FIG. 4, but viewed from another aspect.
Figure 6:
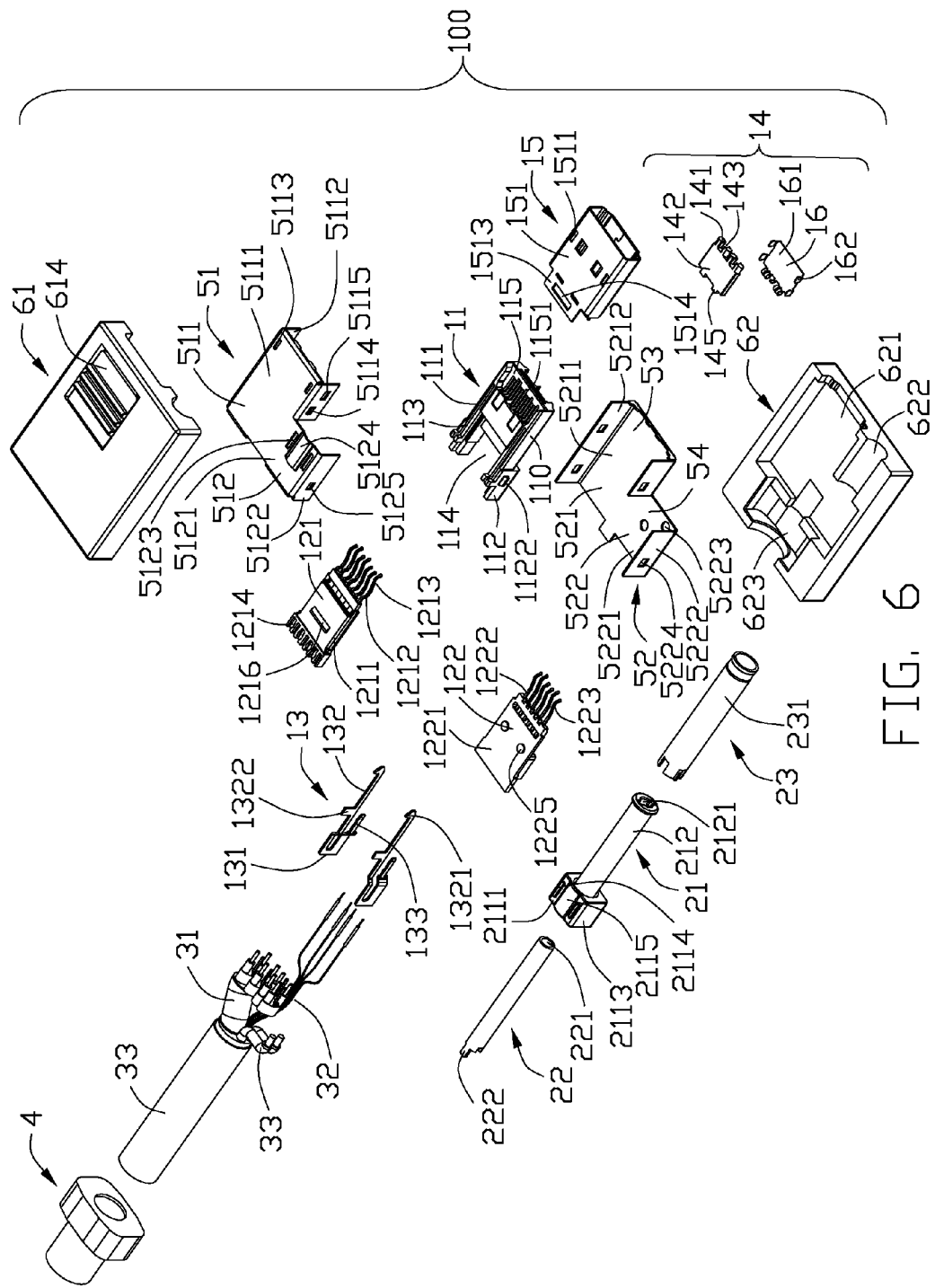
FIG. 6 is an exploded view of the cable assembly shown in FIG. 1.
Figure 7:
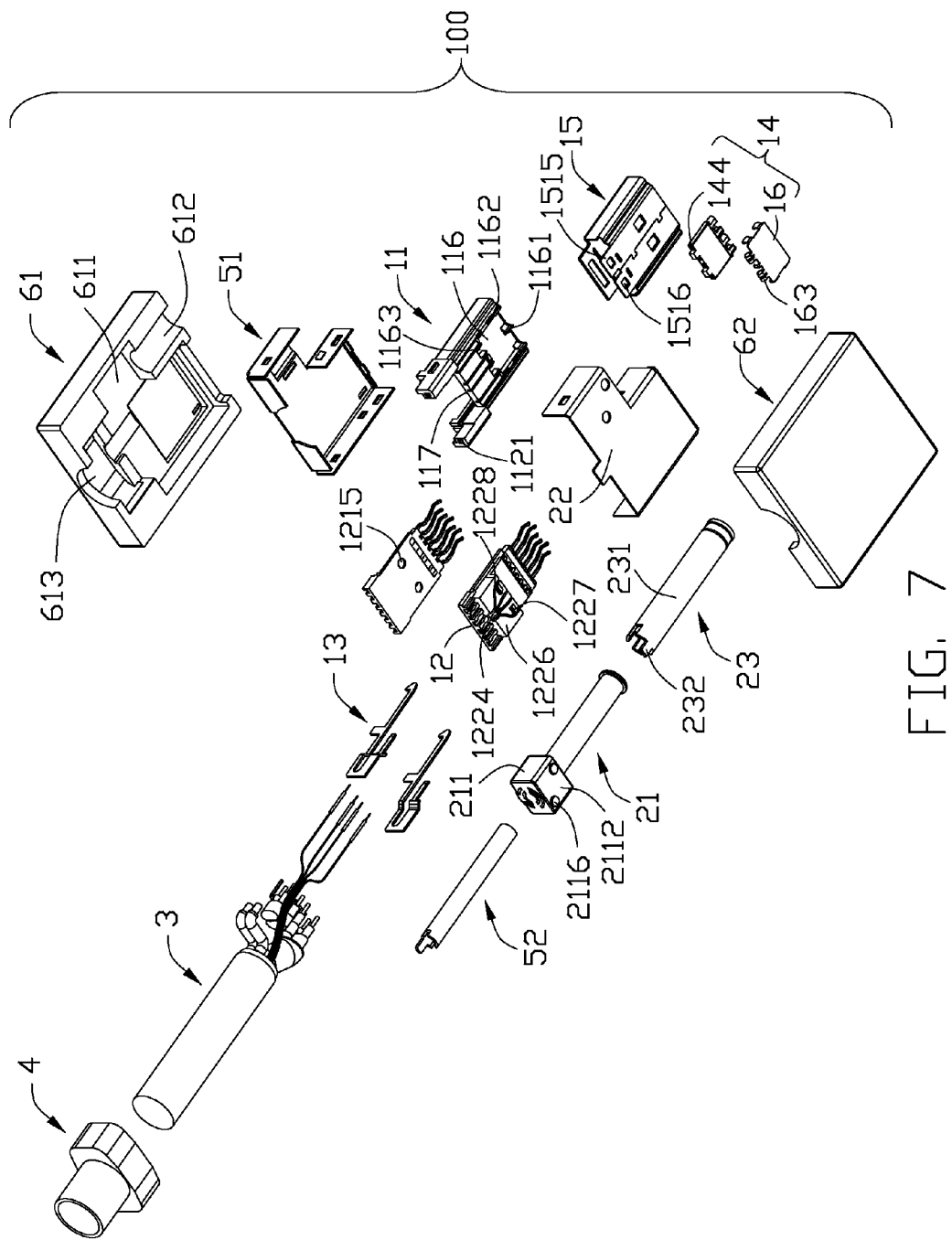
FIG. 7 is similar to FIG. 6, but viewed from another aspect.

Referring to FIGS. 1-3, a cable assembly 100 according to an embodiment of the present invention comprises a first and second connectors 1, 2 arranged in a side by side manner, a cable 3 connecting to the first and second connectors 1, 2, a strain relief 4 disposed around the cable 3, a metallic outer shell 5 retaining the first and second connectors 1, 2, and an external case 6 surrounding the metallic outer shell 5.

Referring to FIGS. 2-7, the first connector 1 is adapted for transmitting both electrical signals of DiiVA (Digital Interactive Interface for Video & Audio) protocol and optical signals. The first connector 1 comprises a first insulative housing 11, a terminal module 12 attached to the first insulative housing 11, a pair of latching members 13, an optical module 14 for transmitting optical signals and a metal shell 15 shielding the first insulative housing 11.

The first insulative housing 11 includes a main portion 111, a pair of mounting arms 112 extending rearwardly from two lateral sides of the main portion 111, and a tongue portion 110 extending forwardly from the main portion 111. A pair of longitudinal slots 113 are defined in the corresponding mounting arms 112. A receiving space 114 is recessed forwardly from a middle segment of a rear edge of the main portion 111. A cavity 115 is recessed downwardly from a top side of the tongue portion 110 and passes through a front end of the tongue portion 110. A set of passageways 1151 are recessed downwardly in the tongue portion 110 and communicating with the cavity 115. A depression 116 is defined in a bottom side of the tongue portion 110 and passes through the front end of the tongue portion 111. In addition, there are three stopping portions 1161 disposed in a front segment of the depression 116. Two guiding slots 1163 are located in a back section of a bottom side of the tongue portion 110. The two guiding slots 1163 are spaced apart from each other along a transversal direction. Four grooves 117 are defined in the bottom side of the main portion 111, and there are two grooves 117 disposed between the two guiding slots 1163 and the other two grooves 117 respectively located at outside of the two guiding slots 1163. Four positioning slots 1162 are defined on two lateral sides of the depression 116.

The terminal module 12 includes a first terminal module 121 and a second terminal module 122. The first terminal module 121 has a first insulator 1211 and a number of first terminals 1212 combined together by insert-molding process. The first terminals 1212 are divided into signal terminals and grounding terminals configured to be longer than the signal terminals. The first terminals 1212 have first contacting portions 1213 extending forwardly beyond the first insulator 1211 and first tail portions 1214 disposed in a back end of the first insulator 1211. Two mounting holes 1215 are defined in a bottom side of the first insulator 1211 and a protruding portion 1216 are formed on a top side of the first insulator 1211. The second terminal module 122 has a second insulator 1221 and a number of second terminals 1222 combined together by insert-molding process. The second terminals 1222 are divided into signal terminals and grounding terminals configured to be longer than the signal terminals. The first and second terminals 1212, 1222 are combined together to adapt for the DiiVA protocol. The second terminals 1222 have second contacting portions 1223 extending forwardly beyond the second insulator 1221 and second tail portions 1224 disposed in back end of the second insulator 1221. Two mounting posts 1225 are formed on a top side of the second insulator 1221. There is a transversal flange 1226 formed on a bottom side of a back segment of the second insulator 1221. In addition, there are four channels 1228 defined in the transversal flange 1226 and extending along a front-to-back direction. There are also two protruding tabs 1227 formed on the transversal flange 1226. The first terminal module 121 and the second terminal module 122 are assembled together, with the first and second contacting portions 1213, 1223 merged into one row, while the first and second tail portions 1214, 1224 separated into two distinct rows along an up-to-down direction. The mounting posts 1225 are inserted into the mounting holes 1215 so as to keep the first terminal module 121 and the second terminal module 122 together. The first terminal module 121 and the second terminal module 122 are assembled to the first insulative housing 11 and accommodated in the receiving space 114, with the first and second contacting portions 1213, 1223 extending into the passageways 1151 and exposed to the cavity 115.

Each latching member 13 includes a connecting arm 131, a latching arm 132 and a retention arm 133. The latching arm 132 and the retention arm 133 are spaced apart from each other and extend forwardly from the connecting arm 131. Each latching arm 132 and the corresponding retention arm 133 are located in a first vertical plane. A pressing tab 1322 is formed on a top side of each latching arm 132. The retention arms 133 are inserted into positioning holes 1121 recessed forwardly from rear faces of the corresponding mounting arms 112, and the latching arms 132 are received in the slots 113 of the first insulative housing 11. The connecting arms 131 are located behind the mounting arms 112 and adjacent to the rear faces of the mounting arm 112, therefore, more space is left between the two connecting arms 131.

The optical module 14 includes a number of lenses 141, a seat 142 supporting the lenses 141 and two guiding members 145 extending backwardly from a back side of the seat 142. The lenses 141 are arranged in a row along a transversal direction and embedded in the seat 142. In addition, the lenses 141 extend beyond front end of the first seat 142, with gaps 143 formed between front portions of every two adjacent lenses 141. The lenses 141 could be one pair or two pairs or more pairs. The optical module 14 is assembled to the depression 116 of the first insulative housing 11, with the two guiding members 145 respectively received in the two guiding slots 1163. The seat 142 is stopped by the stopping portions 1161. The first and second contacting portions 1213, 1223 and the optical module 14 are separated by the tongue portion 110 in the up-to-down direction. The lenses 141 are located in a front of the first and second contacting portions 1213, 1223. A metallic cap 16 is assembled to the first insulative housing 11, and comprises a planar body 161 mounted to and shielding the optical module 14, a plurality of retainers 163 accommodated in the guiding slots 1163 and pressing against back edges of the guiding members 145, a plurality of retaining tabs 162 retained into the positioning slots 1161.

The metal shell 15 includes a frame 151 defining a room to accommodate the tongue portion 110 therein. Two through holes 1511 are defined in a front segment of a top side of the frame 151 to allow hooks 1321 of the latching arm 132 passing through. A first engaging portion 1513 projects backwardly from the top side. There is a positioning hole 1514 defined in the first engaging portion 1513 to latch with the protruding portion 1216 of the first terminal module 121. The frame 151 also has a bottom side with a second engaging portion 1515 projecting backwardly therefrom. There are two positioning holes 1516 defined in the second engaging portion 1515 to latch with the protruding tabs 1227 of the second terminal module 122. The metallic cap 16 is accommodated in the frame 151, sandwiched between the first insulative housing 11 and the bottom side of the frame 151.

The second connector 2 is a power connector for supplying power energy and has a front end located behind a front end of the first connector. The second connector 2 comprises a second insulative housing 21, an annular power contact 22 and a annular grounding contact 23. The second insulative housing 21 has a rectangular base portion 211 and an annular mating portion 212 extending forwardly from the base portion 211. The base portion 211 defines a top face 2111, a bottom face 2112 opposite to the top face 2111 and two side faces 2113 formed at two lateral sides thereof. The base portion 211 has a pair of ribs 2114 formed at the top face 2111 and extending in a front-to-back direction, an arcuate protrusion 2115 located between the two ribs 2114 and extending in the front-to-back direction, and a pair of columniations 2116 protruding downwardly from two diagonal corners of the bottom face 2112. A positioning hole 2121 is defined in the mating portion 212 and passes through the mating portion 212 in the front-to-back direction. The power contact 22 is retained in the positioning hole 2121 and defines an insertion hole 221 passing therethrough. The power contact 22 has a tail portion 222 extending backwardly out of the base portion 211 to connect with the cable 3. The grounding contact 23 has a contacting section 231 surrounding the mating portion 212 and a tail section 232 extending backwardly out of the base portion 211 to connect with the cable 3.

The cable 3 includes a number of first electrical wires 31 connecting with the first and second terminals 1212, 1222, a number of second electrical wires 33 connecting with the power contact 22 and the grounding contact 23, a number of optical fibers 32 connecting with the lenses 141, and a jacket 33 enclosing the first electrical wires 31, the second electrical wires 33, and the fibers 32. The optical fibers 32 are respectively coupled to the lenses 141 and pass through the grooves 117 and the channels 1228. The strain relief member 4 surrounds a front segment of the cable 3 so as to retain the first electrical wires 31, the second electrical wires 33, and the optical fibers 32 together.

The metallic outer shell 5 presents as an L shape and surrounds the main portion 111 and the base portion 211. The metallic outer shell 5 comprises an upper shell 51 and a lower shell 52 combined with each other in an upper-to-lower direction. The upper shell 51 has a first portion 511 covering a top side of the main portion 111 and a second portion 512 covering a top side of the base portion 211. The first portion 511 is longer than the second portion 512 in the front-to-back direction. The first portion 511 has a first top wall 5111 defining perforations 5113 for the hooks 1321 passing through, and a pair of first side walls 5112 extending downwardly from two lateral sides of the first top wall 5111. The first side walls 5112 have first latching tabs 5113 for latching with the lower shell 52 and a pair of openings 5115 for engaging with projections 1122 formed on the mounting arms 112. The second portion 512 has a second top wall 5121 extending from one side of the first top wall 5111, and a second side wall 5122 extending downwardly from an outside of the second top wall 5121. The second top wall 5121 has a pair of apertures 5123 for engaging with the ribs 2114, and an arcuate portion 5124 stamped upwardly therefrom and corresponding to the arcuate protrusion 2114. The second side wall 5122 has a second latching tab 5125 for latching with the lower shell 52.

The lower shell 52 has a third portion 521 corresponding to the first portion 511 and covering a bottom side of the main portion 111, and a fourth portion 522 covering a bottom side of the base portion 211. The third portion 521 is longer than the fourth portion 522 in the front-to-back direction. The third portion 521 has a first bottom wall 5211 and a pair of third side walls 5212 extending upwardly from two lateral sides of the first bottom wall 5211. The third side walls 5212 have first latching holes 5213 for latching with the first latching tabs 5113. The fourth portion 522 has a second bottom wall 5221 extending from one side of the first bottom wall 5111 and corresponding to the second top wall 512, and a fourth side wall 5222 extending downwardly from an outside of the second bottom wall 5221. The second bottom wall 5221 has a pair of retaining holes 5223 for engaging with the columniations 2116. The fourth side wall 5222 has a second latching hole 5224 for latching with the second latching tabs 5125. The first part 511 and the third part 521 combine together to form a long portion surrounding the main portion 111. The second part 512 and the fourth part 522 combine together to form a short portion surrounding the base portion 211.

The external case 6 includes an upper cover 61 and a lower cover 62 combined together in the up-to-down direction and surrounding the metallic outer shell 5. The upper cover 61 has a first chamber 611 for accommodating the upper shell 51, a second chamber 612, and a third chamber 613. A deformable button 614 is formed with the upper cover 61 and floatable along the up-to-down direction to drive the pressing tabs 1322 of the latching arm 132 upwardly or downwardly so as to actuate the hooks 1321 of the latching arm 132 protruding out off or into the frame 151. The lower cover 62 has a fourth chamber 621 for accommodating the lower shell 52, a fifth chamber 622, and sixth chamber 623. The first and fourth chambers 611, 621 combine together and form as an L shaped chamber for receiving the metallic outer shell 5. The second and fifth chambers 612, 622 combine together and form as a circle chamber for receiving a back segment of the mating portion 212. The third and six chambers 613, 623 combine together to retain the strain relief 4.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A cable assembly comprising:
    a first connector comprising a first insulative housing, a plurality of terminals coupled to the first insulative housing for transmitting electrical signals, and an optical module attached to the first insulative housing and stacked with the terminals for transmitting optical signals;
    a second power connector arranged beside the first connector in a side by side manner for supplying power energy; and
    a cable comprising a plurality of first electrical wires connecting with the first terminals, a plurality of optical fibers connecting with the optical module, and a plurality of second electrical wires connecting with the second power connector.

2. The cable assembly according to claim 1, wherein the first insulative housing comprises a main portion and a tongue portion extending forwardly from the main portion, the tongue portion has a cavity recessed downwardly from a top side thereof, a plurality of passageways defined in the tongue portion and communicating with the cavity, and a depression recessed upwardly from a bottom side thereof; the terminals have contacting portions received in the passageways and exposed upwardly to the cavity; the optical module is received in the depression of the tongue portion and has a plurality of lenses exposed to a front face of the tongue portion so as to communicate with exterior in a front-to-back direction directly.

3. The cable assembly according to claim 2, wherein front ends of the terminals are located behind front ends of the lenses in the front-to-back direction.

4. The cable assembly according to claim 2, wherein the second power connector comprises a second insulative housing having a rectangular base portion and an annular mating portion extending forwardly from the base portion, the cable assembly comprises an L-shaped metallic outer shell having a long portion surrounding the main portion, and a short portion extending from one side of a back segment of the long portion and surrounding the base portion.

5. The cable assembly according to claim 4, wherein the base portion has a pair of ribs formed at a top face thereof and extending along the front-to-back direction, and an arcuate protrusion protruding upwardly from the top face and located between the two ribs, the short portion has a pair of apertures formed at a top side thereof to engage with the ribs, and an arcuate portion stamped upwardly from the top side to engage with the arcuate protrusion.

6. The cable assembly according to claim 5, wherein the base portion has a pair of columniations protruding downwardly from two diagonal corners of a bottom face thereof, and the short portion has a pair of retaining holes formed at a bottom side thereof to engage with the columniations.

7. The cable assembly according to claim 4, further comprising an external case surrounding the metallic outer shell, the external case has an L-shaped chamber for retaining the metallic outer shell and a circle chamber for receiving a back segment of the mating portion.

8. The cable assembly according to claim 1, wherein a front end of the second power connector is located behind a front end of the first connector in the front-to-back direction.

9. A cable assembly comprising:
    a first connector comprising a substantially rectangular first mating port protruding forwardly, the first mating port comprising a tongue portion having a cavity recessed downwardly from a top side thereof and a depression recessed upwardly from a bottom side thereof, a plurality of terminals having contacting portions retained in the tongue portion and exposed upwardly to the cavity for transmitting electrical signals, and an optical module received in the depression and having a plurality of lenses exposed to a front face of the tongue portion for transmitting optical signals; and
    a second power connector adapted for supplying power energy and comprising a circle second mating port protruding forwardly, the second mating port defining a front end located behind a front end of the first connector in a front-to-back direction.

10. The cable assembly according to claim 9, wherein the first mating port and the second mating port are spaced apart from each other in a side by side manner.

11. The cable assembly according to claim 9, wherein front ends of the terminals are located behind front ends of the lenses in the front-to-back direction.

12. The cable assembly according to claim 9, wherein the second mating port comprises an annular mating portion defining a positioning hole, an annular power contact retained in the positioning hole, and a grounding contact shrouding the mating portion.

13. The cable assembly according to claim 12, wherein the first connector further comprises a main portion formed behind the tongue portion, the second power connector further comprises a base portion formed behind the mating portion, the cable assembly further comprises an L-shaped metallic outer shell defining a long portion shrouding the main portion, and a short portion extending from one side of a back segment of the long portion and shrouding the base portion.

14. A cable connector assembly comprising:
- a case defining a receiving cavity behind a front mating face defining a long side direction and a short side direction perpendicular to each other;
- first and second connectors side by side disposed on the front mating face along the long side direction,
- the first connector defining an elongated mating port along the long side direction with an electrical mating face in a horizontal plane perpendicular to the front mating face, and an optical mating face in a vertical plane parallel to the front mating face, and a plurality of electrical contacts arranged in one row on the electrical mating face and a plurality of optical lenses arranged in one row on the optical mating face;
- the second connector defining a round mating port beside the elongated mating port;
- a cable extending away from the case and electrically connected to both the first connector and the second connector; and
- the elongated mating port being equipped with a pair of latches moveable in the short side direction, and a pressing button is formed on one primary exterior surface of the case to actuate said latches.

15. The cable connector assembly as claimed in claim 14, wherein the button is not aligned with a center line of the primary exterior surface but in an offset manner.

16. The cable connector assembly claimed in claim 14, wherein said optical mating face is located in front of the electrical mating face.

17. The cable connector assembly as claimed in claim 14, wherein said case is equipped with an inner shell to shield the first connector and the second connector, and said inner shell defines an L-shaped configuration.

18. The cable connector assembly as claimed in claim 14, wherein the second connector defines a rectangular body behind the cylindrical mating port, and said cylindrical mating port is dimensioned more than two times that of the rectangular body in a front-to-back direction.

19. The cable connector assembly as claimed in claim 14, wherein said cable is directly mechanically connected to the connectors.

* * * * *